United States Patent [19]
Kerollis et al.

[11] Patent Number: 5,269,944
[45] Date of Patent: Dec. 14, 1993

[54] METHOD FOR REMOVING HYDROGEN SULFIDE FROM UNTREATED WATER

[75] Inventors: Raymond E. Kerollis, Hightstown; Edgar R. Mowrey, Princeton, both of N.J.

[73] Assignee: International Process Technology, Inc., Lake Worth, Fla.

[21] Appl. No.: 882,703

[22] Filed: May 14, 1992

[51] Int. Cl.$^5$ ................................................ C02F 1/76
[52] U.S. Cl. .................................... 210/754; 210/758; 210/916
[58] Field of Search ............... 210/696, 743, 750, 754, 210/758, 916

[56] References Cited

U.S. PATENT DOCUMENTS 4,264,451  4/1981  Pope et al. ......................... 210/721
5,096,589  3/1992  Blind et al. ......................... 210/638

Primary Examiner—Ivars Cintins
Attorney, Agent, or Firm—Watov & Kipnes

[57] ABSTRACT

A method of treating untreated water containing hydrogen sulfide by adjusting the pH of the untreated water to a pH level of no greater than 6.0 and thereafter converting the hydrogen sulfide in the pH treated water to sulfuric acid while adjusting the pH of the water to a level sufficient to prevent the formation of elemental sulfur.

15 Claims, 2 Drawing Sheets

METHOD FOR REMOVING HYDROGEN SULFIDE FROM UNTREATED WATER

FIELD OF THE INVENTION

The present invention is generally directed to a method of treating untreated water and particularly for removing hydrogen sulfide therefrom without the formation of elemental sulfur.

BACKGROUND OF THE INVENTION

The present invention relates to a method for treating untreated water containing hydrogen sulfide ($H_2S$). Untreated water containing $H_2S$ is found in well, surface and process waters used for both municipal potable and industrial uses, and concentrated brine solutions such as discharge streams from a reverse osmosis facility. The method of the invention involves converting the alkalinity ($HCO_3^-$) in the water to carbon dioxide ($CO_2$), and then converting the $H_2S$ to sulfate ($SO_4^{-2}$) ions. The resulting water may then be treated according to need to adjust the pH and/or hardness.

In a number of geographical areas, both municipal drinking water treatment plants and industrial plants are fed with water which contains $H_2S$. The presence of $H_2S$ in the water imparts a "rotten egg odor" and can lead to the formation of elemental sulfur which affects turbidity. In $H_2S$ laden waters treated with reverse osmosis, the $H_2S$ will pass into the concentrated brine reject stream. The $H_2S$ must be removed before discharging the brine to a surface water body.

The customary method of eliminating the $H_2S$ from the source water is to adjust the pH to 5.5-6.0 with a strong mineral acid such as sulfuric acid. After pH adjustment, the water is degassified by forced draft degassifiers, sometimes followed by a gas scrubber to clean the gasses prior to their release to the atmosphere. This degassification/scrubbing process is inefficient because $H_2S$ emissions and resulting odor problems inevitably occur. In addition degassification saturates the water with oxygen, resulting in downstream corrosion problems in the metal distribution piping, e.g., copper pipe. More specifically, scattered incidences of copper pipes developing holes frequently occur. Furthermore, corrosion of metal and concrete structures within the vicinity of degassification results in reduced life of the buildings.

Degassification therefore requires removal of oxygen from the water to prevent corrosion. Common methods for removing oxygen include treating the water with sodium sulfite ($Na_2SO_3$) or hydrazine ($N_2H_4$). Another oxygen removing method is vacuum degassification. However, all such oxygen removal procedures result in either unacceptable water quality or excessively high costs.

In order to avoid the presence of oxygen, the $H_2S$ can be oxidized with a suitable oxidizing agent such as chlorine.

In the reaction of $H_2S$ with chlorine, two chemical reaction paths may result, one of which causes problems in the water treatment and distribution system. The chemical reaction of $H_2S$ and chlorine can proceed as follows:

$$H_2S + Cl_2 \rightarrow 2HCl + S° \quad (1)$$

$$H_2S + 4Cl_2 + 4H_2O \rightarrow H_2SO_4 + 8HCl \quad (2)$$

The formation of elemental sulfur as shown in Equation (1) creates turbidity in the water and fouls downstream equipment. The removal and disposal of the sulfur results in high capital and operating costs. On the other hand, the reaction path of equation (2) shows that all of the $H_2S$ is oxidized to sulfate ($SO_4^{-2}$), which remains in solution as a harmless anion.

The problem facing water treatment facilities is how to eliminate the formation of elemental sulfur produced in accordance with Equation (1). This has proven to be very difficult, and chlorine induced oxidation of $H_2S$ has therefore been largely limited to situations where the elemental sulfur may remain in the water, such as in irrigation systems (where the sulfur is discharged along with the water itself) or in raw water feeds to water treatment plants (where filtration or other methods are then used to remove the elemental sulfur).

It would therefore be of a significant advance in the treatment of water to remove $H_2S$ if the reaction represented by equation (1) is substantially reduced or eliminated so that little if any elemental sulfur is formed.

SUMMARY OF THE INVENTION

The present invention is directed to a method of treating untreated water which contains hydrogen sulfide in a manner which removes substantially all of the hydrogen sulfide without forming elemental sulfur.

The method comprises adjusting the pH level of the untreated water to no more than 6.0 at which level a sufficient portion of bicarbonate ions ($HCO_3^-$) is converted to carbon dioxide. The pH adjusted water is then treated with an agent which converts the hydrogen sulfide to sulfuric acid while adjusting the pH of the water to a level sufficient to prevent the formation of elemental sulfur. Depending on the end use, the resulting water may optionally be further treated to adjust the pH and hardness.

The method of the present invention results in the conversion of hydrogen sulfide to harmless sulfate ions ($SO_4^{-2}$) without the formation of elemental sulfur and the disposal problems associated therewith. The treatment of untreated water in accordance with the present invention can be used to produce potable water and process water from hydrogen sulfide laden water sources.

BRIEF DESCRIPTION OF THE DRAWING

The following drawings are illustrative of embodiments of the invention and are not intended to limit the invention as encompassed by the claims forming part of the application.

DETAILED DESCRIPTION OF THE INVENTION

The method of the present invention is directed to the treatment of untreated water containing hydrogen sulfide. The source of the water is unlimited and can include naturally occurring water from wells, aquifers and the like, as well as by-product water from industrial applications.

The amount of hydrogen sulfide that may be contained in the untreated water is unlimited, but typically ranges from about 0.1 to 100 ppm.

The untreated water is first treated to adjust the pH level to no greater that 6.0 at which level bicarbonate ions ($HCO_3^-$) are converted to carbon dioxide. The pH level is preferably adjusted to a level of no greater than 5.5, most preferably in the range of 4.2 to 5.5. The pH level may be adjusted in this manner by adding a strong mineral acid such as hydrochloric or sulfuric acid in accordance with the following equations:

$$HCO_3^- + H^+ + Cl^- \rightarrow CO_2 + Cl^- + H_2O \quad (3)$$

$$2HCO_3^- + 2H^{30} + SO_4^{-2} \rightarrow 2CO_2 + SO_4^{-2} + 2H_2O \quad (4)$$

Alternatively dioxide may be added to the untreated water to reduce the pH and convert the bicarbonate ions to carbon dioxide.

Subsequent to the pH adjustment, the water is treated with a suitable oxidizing agent such as gaseous chlorine which reacts with the hydrogen sulfide to form sulfuric acid and hydrochloric acid. The amount of oxidizing agent added to the pH adjusted water is at least a stoichiometric amount. This enables all of the hydrogen sulfide to react with the oxidizing agent. When using gaseous chlorine as the oxidizing agent, the amount of chlorine required is about 8.33 ppm per 1 ppm of hydrogen sulfide.

The addition of oxidizing agent drops the pH of the water to 3.5 or below, preferably to about 2.5 to 3.2. Sulfuric acid is formed while elemental sulfur is at least substantially absent. Hydrochloric acid is also formed when the oxidizing agent is gaseous chlorine. Upon treatment with the oxidizing agent, the resulting water is at least substantially free of hydrogen sulfide.

The water may then be neutralized to raise the pH to any desired level such as in the range of 6.5 to 8.5 for potable water. Neutralization can be accomplished by adding a suitable base or basic salt, preferably alkali and alkaline earth metal hydroxides and carbonates. Examples of such compounds include lime, sodium carbonate, sodium hydroxide, potassium hydroxide, magnesium hydroxide and suitable mixtures thereof.

Neutralization may also be accomplished by passing the treated water through a calcite contact bed. The advantage of this procedure is that the pH of the treated water is neutralized to 7.0 to 7.3 and the hardness of the water is elevated to improve taste and reduce the corrosiveness of the water.

Figure 1:
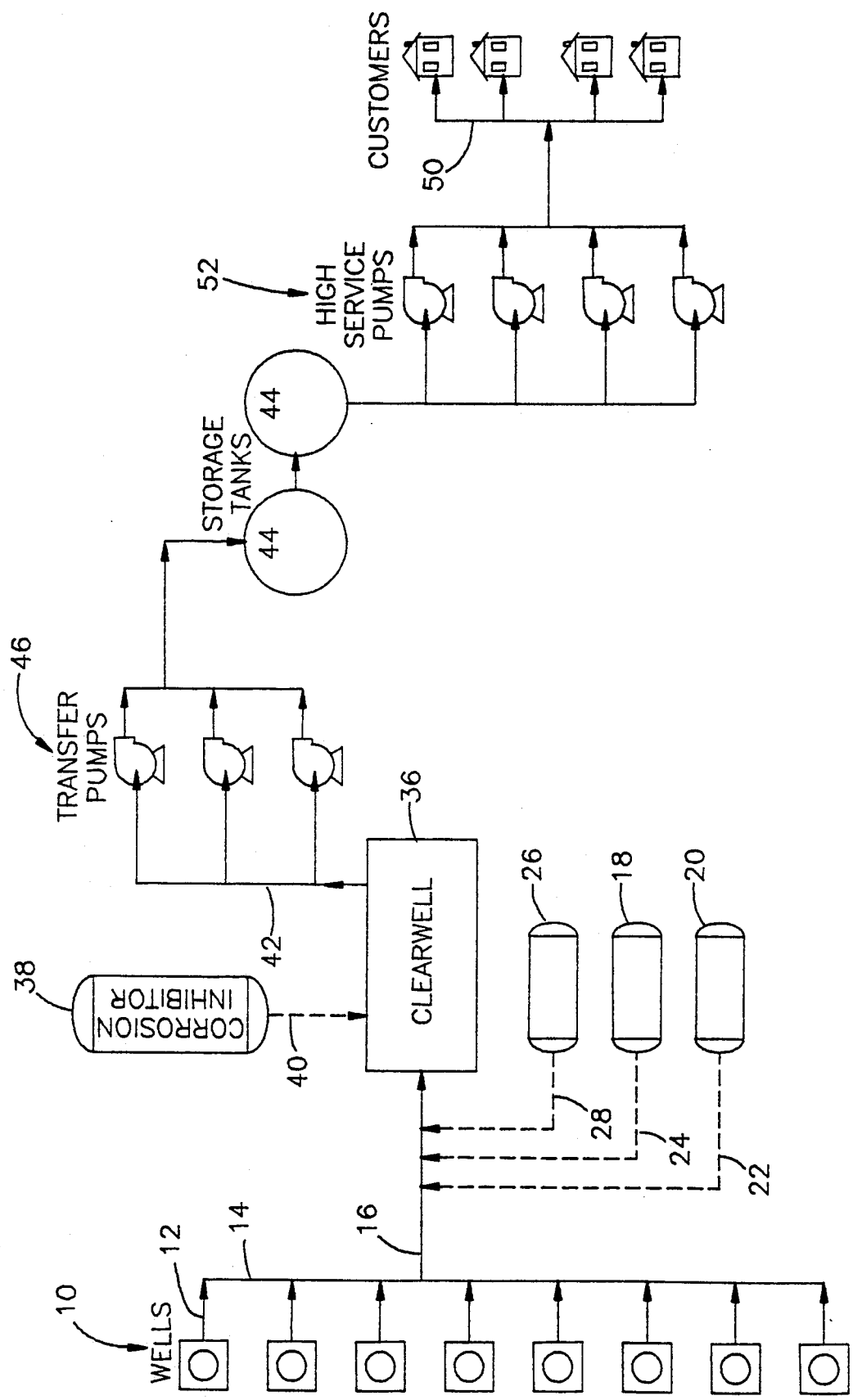
FIG. 1 is a schematic view of an embodiment of the invention for the treatment of natural well water to produce potable water wherein a base is injected into the water after the hydrogen sulfide is converted to sulfate.

Referring to FIG. 1, there is shown an embodiment of the invention for treating hydrogen sulfide laden well water to make the same suitable for consumption. Untreated well water is obtained from one or more wells 10 via lines 12, 14 to a main line 16 via water pumps (not shown) which raise the pressure of the water to at least 40 psig to provide the pressure necessary to operate the chlorine injector 18.

Prior to the addition of gaseous chlorine, the pH of the water is adjusted preferably to 4.2-5.5 by the addition of an acid such as sulfuric acid or hydrochloric acid or carbon dioxide. The acid or carbon dioxide is provided from a tank 20 via a line 22. After the pH adjustment, the gaseous chlorine is injected from the chlorine injector 18 via the line 24 into the line 16 using conventional equipment for the injection of gaseous chlorine.

Downstream of the injector 18, the stream is then neutralized utilizing a basic substance such as lime, sodium carbonate, potassium hydroxide, magnesium hydroxide or sodium hydroxide which flows from a storage tank 26 via the line 28 to the line 16.

As an alternative to the direct chemical injection neutralization shown in FIG. 1, the chlorinated water can be fed into a calcite contact bed. The calcite bed neutralizes the pH as well as adds hardness to the water. An embodiment of this aspect of the invention is shown in FIG. 2.

Figure 2:
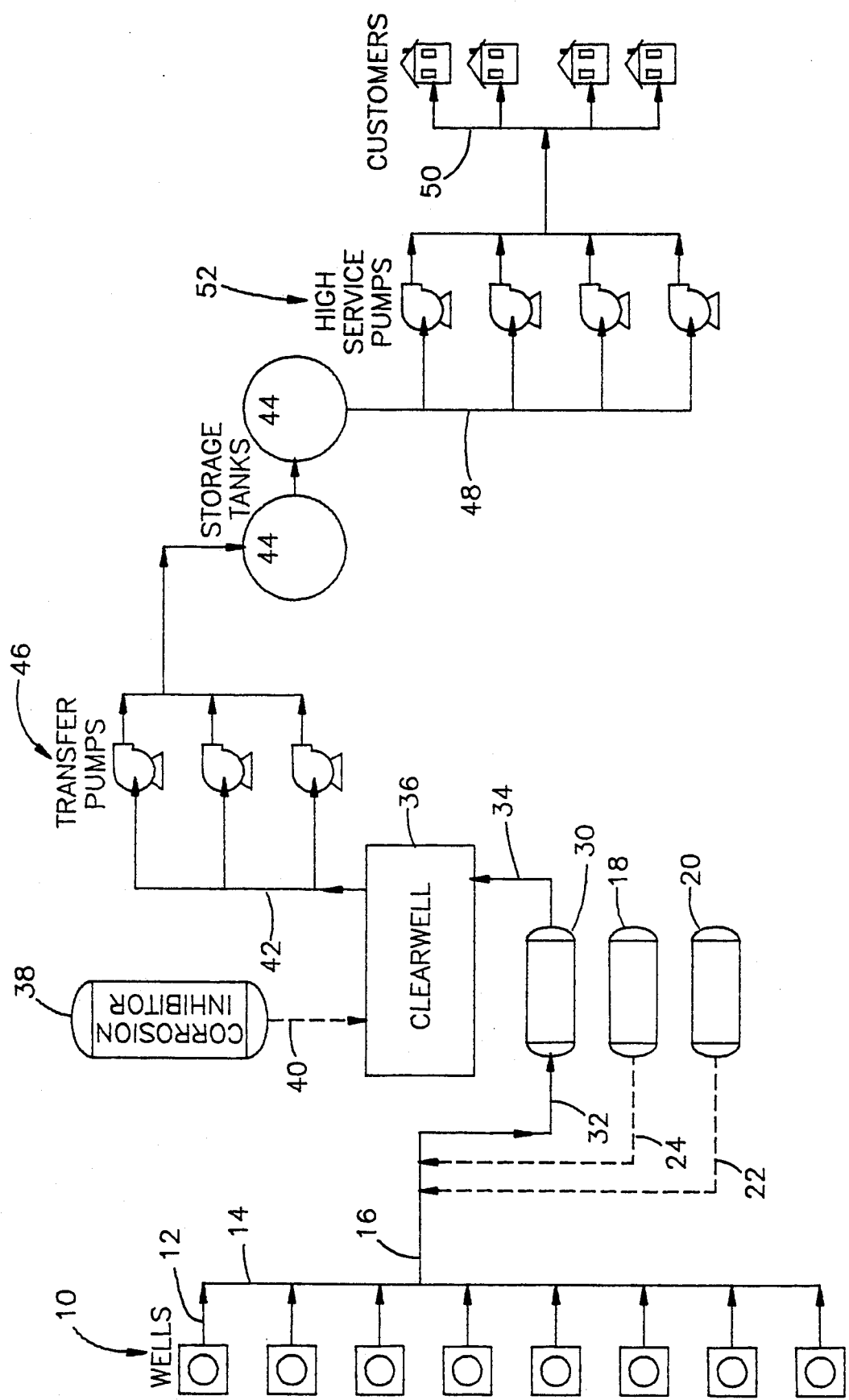
FIG. 2 is a schematic view of another embodiment of the invention in which the hydrogen sulfide free water is passed through a calcite bed.

Referring to FIG. 2, the water, after being treated with acid or carbon dioxide and an oxidizing agent such as chlorine, is fed to a calcite bed 30 via the line 32. The water passing through the bed 30 is pH adjusted to within the range of 7.0-7.3 before emerging from the bed 30 through the line 34.

The thus treated water, as shown in FIG. 1 and 2, is transferred to a clearwell 36. Corrosion inhibitors such as zincates and polyphosphates are added to the water in the clearwell 36 from a storage vessel 38 via the line 40. The water is then transferred to the location of its end use.

As shown in FIGS. 1 and 2, the treated water is transferred via the line 42 to a storage tank 44 through the use of transfer pumps 46 and then to individual homes via lines 48 and 50 through the assistance of high service pumps 52. It should be understood that the transportation of the treated water from the clearwell 36 to the location of intended use is well within the routine skill of the art.

EXAMPLE

A full scale evaluation of the process was conducted on a concentrated brine reject stream from a reverse osmosis system. Due to the very high level of contaminants in the brine, this is considered to be the worse possible case for testing the process. Therefore, the process is effective on any untreated water with less contaminants than the concentrated brine. In this evaluation, sulfuric acid was used to adjust the pH of the concentrated brine to 5.5. Gaseous chlorine was injected as the oxidant and sodium hydroxide was used as the final pH neutralizer. The content of the untreated water and the content of the water after treatment in accordance with the present invention is shown in Table 1.

TABLE 1

| | CONCENTRATED BRINE WATER ANALYSIS | | |
|---|---|---|---|
| Ions | Brine Untreated mg/L | Brine pH Adjusted mg/L | After $Cl_2$ mg/L |
| Ca | 1,492.0 | 1,493.0 | 1,492.0 |
| Mg | 314.0 | 314.0 | 314.0 |
| Na | 3,970.0 | 4,003.0 | 4,005.0 |
| K | 200.0 | 202.0 | 202.0 |
| $NH_4$ | 0.0 | 0.0 | 0.0 |
| $CO_3$ | 600.0 | 0.0 | 0.0 |
| $HCO_3$ | 997.0 | 196.0 | 0.0 |
| $SO_4$ | 2,398.0 | 3,518.0 | 3,530.0 |
| Cl | 6,772.0 | 6,821.0 | 6,855.0 |
| $NO_3$ | 2.0 | 2.0 | 2.0 |
| F | 10.0 | 10.0 | 10.0 |
| $SiO_2$ | 100.0 | 102.0 | 102.0 |
| TDS | 16,356.0 | 16,565.0 | 16,611.0 |
| $CO_2$ | 9.0 | 214.0 | 355.0 |
| pH | 8.3 | 5.5 | 3.2 |
| $H_2S$ | 4.1 | 4.1 | 0.0 |
| Dissolved $O_2$ | 0.6 | — | 0.56 |

As shown Table 1:

(a) The 4.1 ppm of $H_2S$ in the untreated water was reduced to zero in the treated water.

(b) The dissolved oxygen level in the chlorinated water was in the range of 0.2 to 0.6 ppm, identical to that in the untreated water. Therefore, the method of the present invention does not increase the oxygen content of the water.

(c) Complete $H_2S$ removal was obtained by monitoring the chlorine residual in the water. As the chlorine flow increased, the $H_2S$ remaining in the treated water decreased. The moment a chlorine residual of any level was observed, the $H_2S$ level was observed to be zero. The chlorine flow was adjusted to oxidize all the $H_2S$.

(d) No detectable elemental sulfur or rotten egg odor was present in the treated water.

From this evaluation, it was determined that the process succeeds largely as a result of the conversion of $HCO_3^-$ in the water to $CO_2$ before the chlorine is added at a pH level of no greater than 6.0, preferably no greater than 5.5, most preferably in the range of 4.2 to 5.5. Since there is little alkalinity to buffer the reaction, the pH of the water drops very rapidly to around 2.5 to 3.2 when the gaseous chlorine is added. It was found that the reaction was completed shortly downstream of the chlorine injection point. This rapid drop in pH assures that the reaction proceeds as desired, according to Equation (2) with no elemental sulfur being formed.

When the gaseous chlorine is added to the water in an amount necessary to ensure complete oxidation of the $H_2S$, the pH of the water falls to a range of about 2.5–3.2. Neutralization is required if potable water is the desired end product. Lime, potassium hydroxide, magnesium hydroxide, sodium hydroxide, sodium carbonate or a calcite bed can be used to raise the pH to desired levels.

What we claim is:

1. A method of treating untreated water containing hydrogen sulfide comprising the steps of:
    (a) adjusting the pH of the water with a strong acid or carbon dioxide to a level of no greater than 6.0 at which level $HCO_3^-$ ions present in the water are converted to carbon dioxide; and
    (b) adding gaseous chlorine to the pH adjusted water to convert the hydrogen sulfide to sulfuric acid while adjusting the pH of the water to a level sufficient to prevent the formation of elemental sulfur and thereby form at least substantially hydrogen sulfide free water.

2. The method of claim 1 wherein the $HCO_3^-$ ions are converted to carbon dioxide at a pH level of no greater than 5.5.

3. The method of claim 1 wherein the $HCO_3^-$ ions are converted to carbon dioxide at a pH level of from about 4.2 to 5.5.

4. The method of claim 1 wherein the strong acid is selected from the group consisting of hydrochloric acid and sulfuric acid.

5. The method of claim 1 wherein the pH level of the water is adjusted to no more than 3.5.

6. The method of claim 5 wherein the pH level is lowered to about 2.5 to 3.2.

7. The method of claim 5 comprising lowering the pH level of the water to about 2.5 to 3.2 and neutralizing the oxidized water.

8. The method of claim 5 wherein the amount of gaseous chlorine added to the water is a stoichiometric amount.

9. The method of claim 8 wherein the amount of gaseous chlorine added to the water is sufficient to provide about 8.33 ppm of chlorine per 1 ppm of hydrogen sulfide.

10. The method of claim 1 further comprising neutralizing the at least substantially hydrogen sulfide free water to a desired pH level.

11. The method of claim 10 further comprising adjusting the hardness of the water.

12. The method of claim 11 wherein the step of neutralizing the oxidized water comprises adding an effective amount of at least one neutralizing agent selected from the group consisting of lime, alkali and alkaline earth metal carbonates and hydroxides.

13. The method of claim 1 wherein the untreated water is a concentrated brine reject water supply from a reverse osmosis water treatment operation or an industrial process waste water stream.

14. A method of treating untreated water containing hydrogen sulfide comprising the steps of:
    (a) adjusting the pH of the untreated water to a pH level of from about 4.2 to 5.5 with a strong acid or carbon dioxide;
    (b) adding gaseous chlorine to the pH adjusted water to convert the hydrogen sulfide to sulfuric acid while lowering the pH level of the water to about 2.5 to 3.2.

15. The method of claim 14 wherein the amount of gaseous chlorine added to the water is sufficient to provide about 8.33 ppm of chlorine per 1 ppm of hydrogen sulfide.

* * * * *